May 9, 1950   C. T. BUSSE   2,506,661
APPARATUS FOR LOADING AND UNLOADING CANS WITH CONVEYER
MECHANISM IN CONJUNCTION WITH A HYDRAULIC HOIST
AND A CRATE HAVING FALSE BOTTOMS
Filed April 9, 1943   4 Sheets-Sheet 1
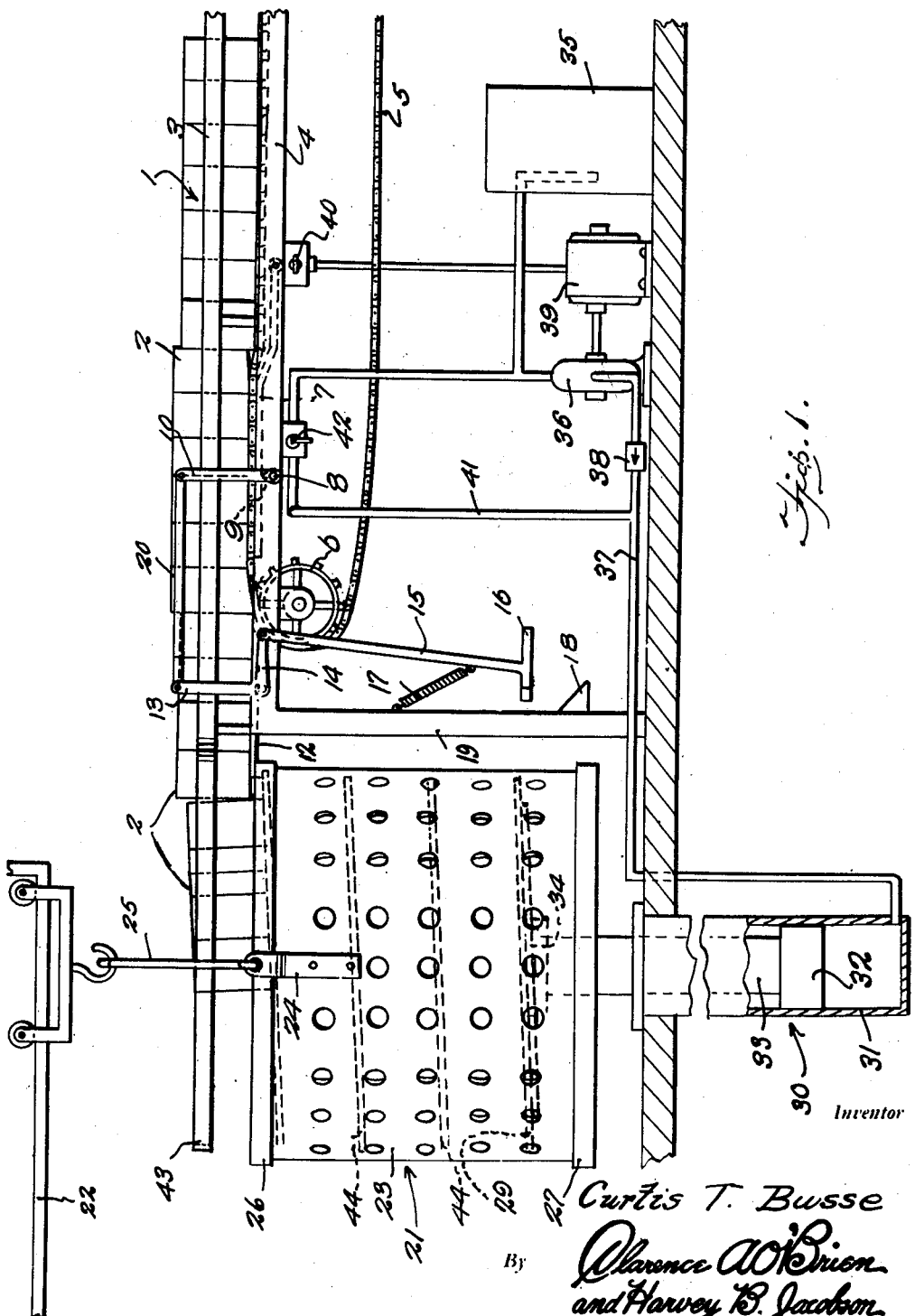

May 9, 1950            C. T. BUSSE            2,506,661
APPARATUS FOR LOADING AND UNLOADING CANS WITH CONVEYER
MECHANISM IN CONJUNCTION WITH A HYDRAULIC HOIST
AND A CRATE HAVING FALSE BOTTOMS
Filed April 9, 1943            4 Sheets-Sheet 2
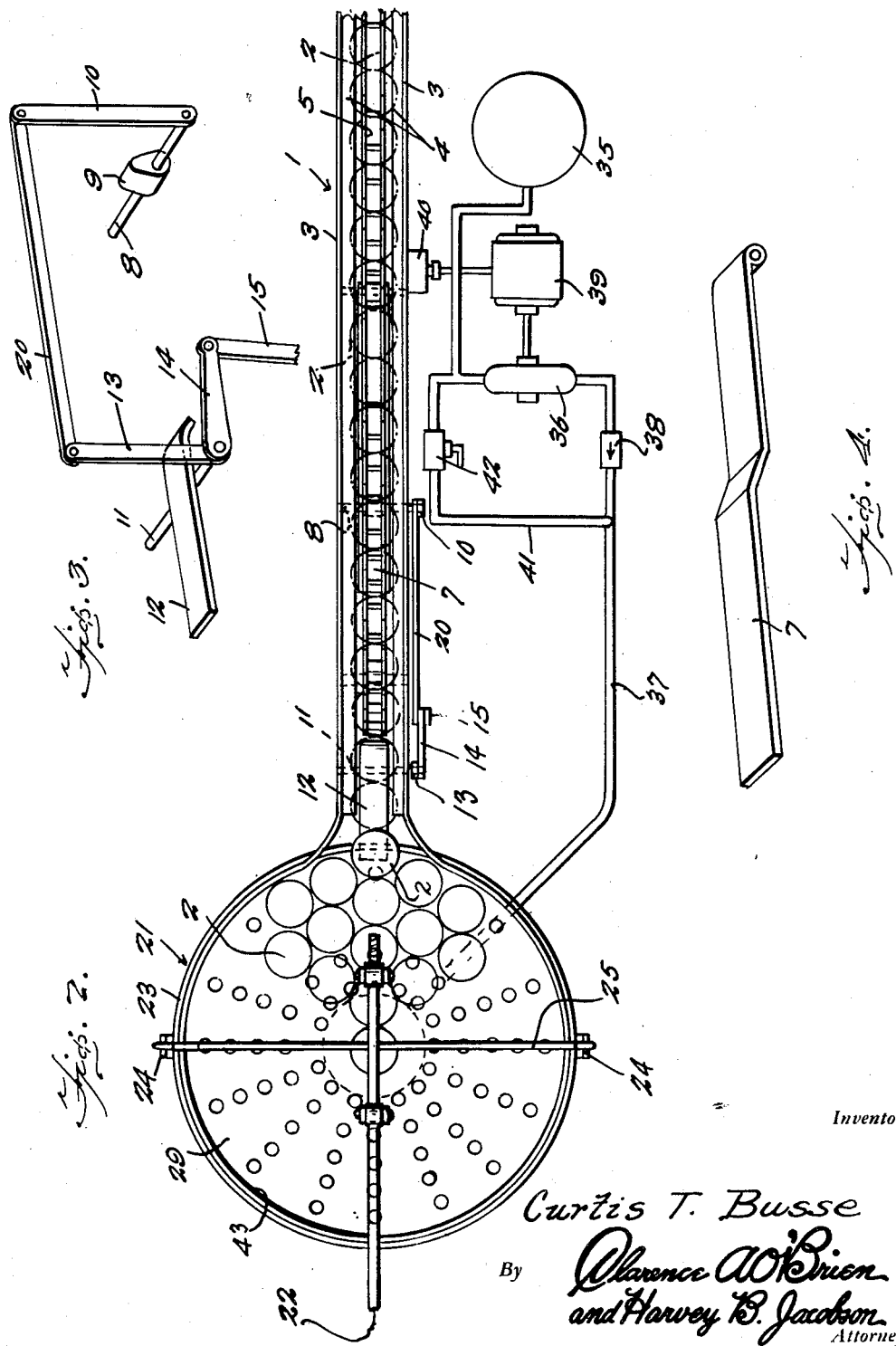
Inventor
Curtis T. Busse
By Clarence A. O'Brien
and Harvey B. Jacobson
Attorneys May 9, 1950 C. T. BUSSE 2,506,661
APPARATUS FOR LOADING AND UNLOADING CANS WITH CONVEYER
MECHANISM IN CONJUNCTION WITH A HYDRAULIC HOIST
AND A CRATE HAVING FALSE BOTTOMS
Filed April 9, 1943 4 Sheets-Sheet 3
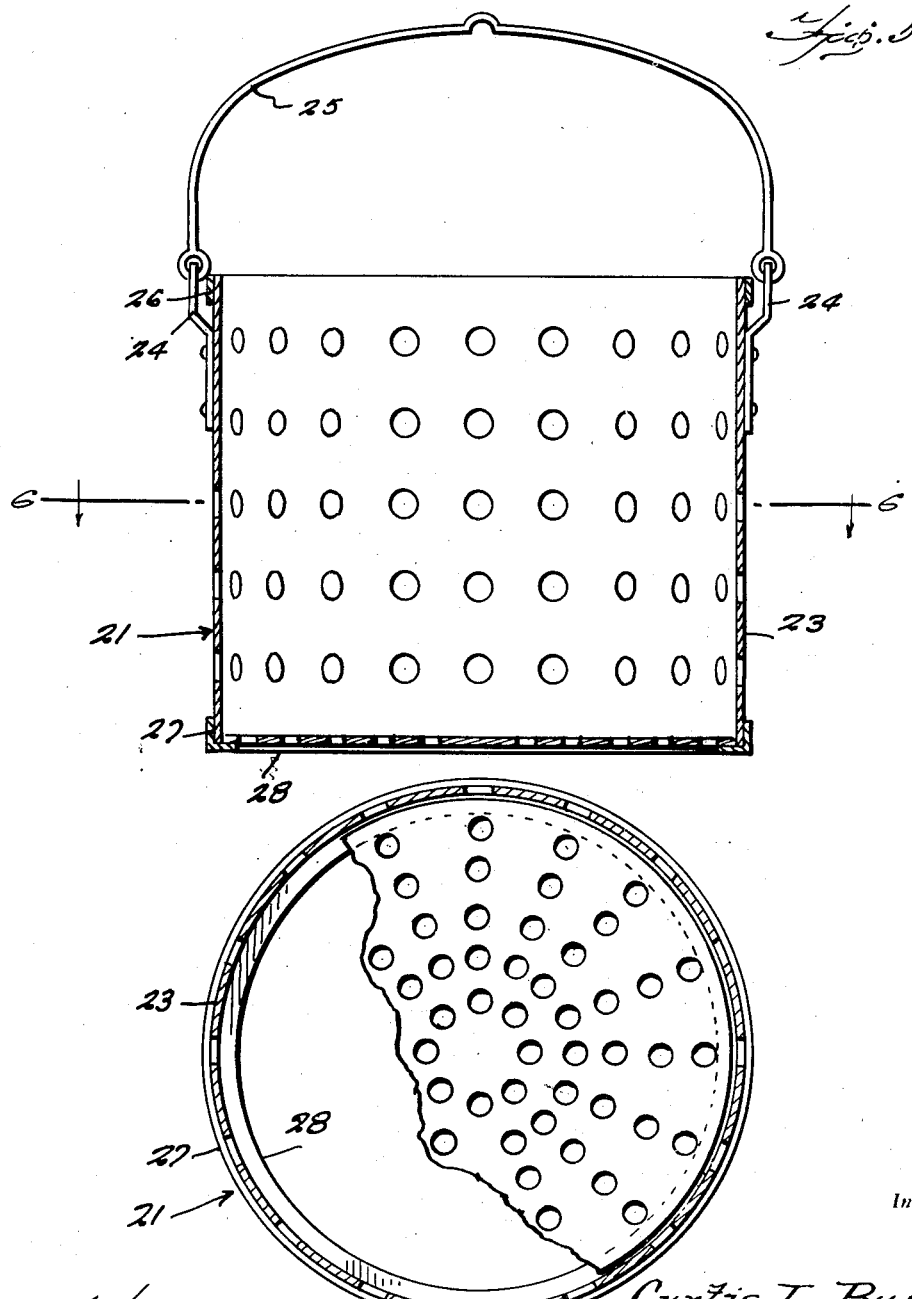

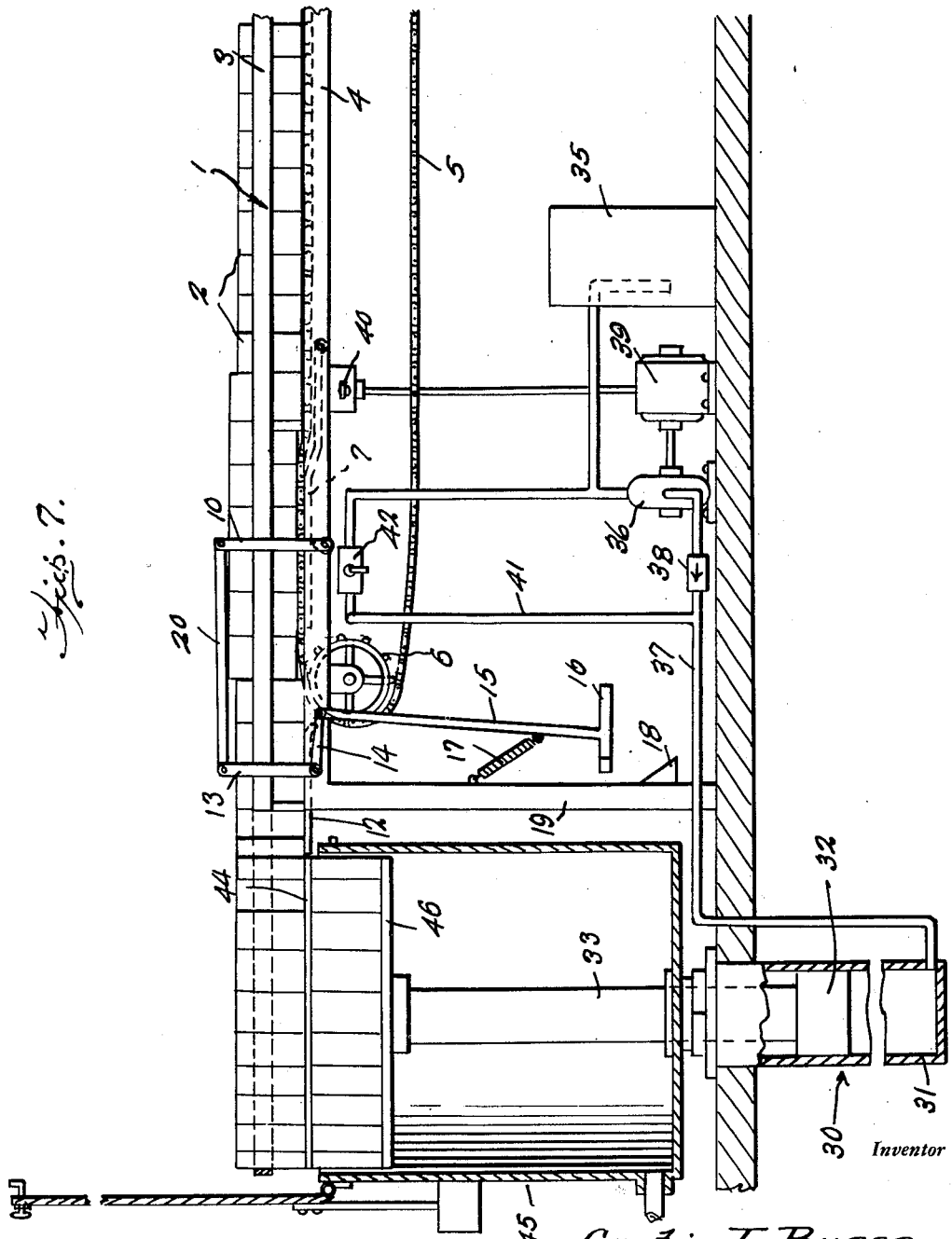

Patented May 9, 1950

2,506,661

UNITED STATES PATENT OFFICE 2,506,661

APPARATUS FOR LOADING AND UNLOADING CANS WITH CONVEYER MECHANISM IN CONJUNCTION WITH A HYDRAULIC HOIST AND A CRATE HAVING FALSE BOTTOMS

Curtis T. Busse, Randolph, Wis.

Application April 9, 1943, Serial No. 482,434

5 Claims. (Cl. 226—16)

The present invention relates generally to new and useful improvements in cannery machinery or equipment, and has for its primary object to provide, in a manner as hereinafter set forth, a novel apparatus for facilitating the loading of canned goods into a retort crate or basket, or for loading said canned goods directly into the retort and for raising the hot cans in the crate or basket for discharge over the edge thereof following processing.

Another very important object of the invention is to provide, in an apparatus of the aforementioned character comprising a conveyer and a crate or basket for receiving the filled cans therefrom, unique means for controlling the flow or discharge of said cans from said conveyer.

Still another important object of the invention is to provide a canned goods handling apparatus of the character set forth which includes novel means for supporting the bottom of the retort crate or basket for vertical adjustment to facilitate the loading thereof in successive layers from the conveyer.

A still further important object of the invention is to provide an apparatus for handling canned goods which includes a crate or basket of unique construction for use in conjunction with the supporting means.

Other objects of the invention are to provide a loading apparatus of the character set forth which will be comparatively simple in construction, strong, durable, highly efficient and reliable in operation, compact, and which may be manufactured and installed at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a view in side elevation of an apparatus constructed in accordance with the present invention, showing the lower portion of the hydraulic lift cylinder broken away in section.

Figure 2 is a top plan view of the invention.

Figure 3 is a perspective view of the means for controlling the discharge of the cans from the conveyer.

Figure 4 is a detail view in perspective of the cam-operated shoe for raising and lowering the conveyer chain.

Figure 5 is a view in vertical section through the retort crate or basket.

Figure 6 is a view in horizontal section, taken substantially on the line 6—6 of Figure 5.

Figure 7 is a view in side elevation, showing the apparatus installed for loading the cans directly into a cooking retort, the latter being illustrated in vertical section.

Referring now to the drawing in detail, it will be seen that reference numeral 1 designates generally a conveyer for the filled cans 2. The conveyer 1 comprises side rails 3 and spaced, parallel bottom rails 4 between which an endless chain 5 is operable. The endless chain 5 is trained around sprocket wheels 6 which are provided therefor. The chain 5 constitutes means for moving the cans 2 along the bottom rails 4 of the conveyer.

Mounted longitudinally between the rails 4 on the discharge end portion of the conveyer 1 is a shoe 7 over which the chain 5 is slidable. A shaft 8 is journaled transversely on the rails 4 beneath the shoe 7. Fixed on the shaft 8 is a cam 9 which is engaged beneath the shoe 7 for lowering and subsequently raising same. Thus, this portion of the chain 5 may be lowered out of engagement with the cans 2 for permitting said cans to rest entirely on the rails 4. Also fixed on the shaft 8, on one side of the conveyer 1, is an operating arm 10.

In the embodiment shown, another shaft 11 is journaled transversely in the rails 4 closely adjacent the discharge end of the conveyer 1. A combined control gate and bridge 12 is fixed at an intermediate point on the shaft 11 for operation between the rails 4. Arms 13 and 14 are fixed on one end portion of the shaft 11. A foot-operated bar 15 depends from the arm 14 and is provided with a pedal or the like 16 on its lower end. A coil spring 17 is connected to the bar 15 for swinging the gate 12 downwardly to open position. The pedal 16 is engageable beneath a suitable keeper 18 on the adjacent upright 19 of the conveyer structure for releasably securing the gate 12 in closed position against the tension of the spring 17. A rod 20 connects the arm 10 to the arm 13 for actuating the cam 9 in unison with the gate 12.

A perforated crate or basket 21 is provided for receiving the cans from the conveyer 1. The crate 21 is suspended from a conventional overhead track 22 and operable thereon to and from the retort. The basket 21 includes a cylindrical, perforated body 23 having mounted on its upper portion diametrically opposite, outwardly offset ears or the like 24 to which a suspension bail or handle 25 is pivotally connected. Rings 26 and 27 encircle the upper and lower portions of the body 23 of the basket or crate 21. The lower ring 27 is provided with an internal flange 28. The flange 28 constitutes a support for the perforated, vertically movable bottom 29 of the crate 21.

When in position to be loaded from the conveyer 1, the crate 21 is located above a hydraulic lift 30. The lift 30 includes a vertical cylinder 31 for the reception of fluid. A piston 32 is operable in the cylinder 31. The piston 32 is mounted on the lower end of a rod or plunger 33 which is operable through the upper end of the cylinder 31. A head 34 on the upper end of the rod 33 is engageable beneath the crate bottom 29 for raising and lowering said bottom and, as shown in Fig. 1, has a top surface inclined with reference to the axis of the crate whereby to tilt slightly respecting the crate axis, the false bottom resting upon such head.

A reservoir 35 contains a suitable fluid for separating the piston 32 within the cylinder 31. A pump 36 delivers fluid under pressure to the cylinder 31 from the reservoir 35 through a line 37. A check valve 38 prevents return flow of the fluid to the pump 36. An electric motor 39 drives the pump 36, said motor being controlled by a switch 40. The fluid returns to the reservoir 35 around the check valve 38 and the pump 36 through a line 41 which is controlled by a valve 42. By this mechanism the vertically adjustable bottom 29 of the crate 21 may be elevated to any desired position.

Describing the operation of the apparatus, the crate 21 is positioned at the discharge end of the conveyer 1 over the lift 30. The electric motor 39 is then energized for driving the pump 36, thus forcing fluid from the reservoir 35 into the lower portion of the cylinder 31 for elevating the members 32, 33 and 34. In this manner the bottom 29 of the basket 21 is raised to a position where its higher side is substantially flush with the conveyer. Due to its inclination, the false bottom is slightly below the rim of the basket on its lower side, whereby the rim confines the cans except at the high side of the false bottom, where transfer over the rim occurs. With the gate 12 in lowered or horizontal position, the cans 2 move thereover from the conveyer 1 onto the elevated bottom 29 of the crate 21. A ring or band 43 projects horizontally from the side rails 3 at the discharge end of the conveyor 1 for confining the cans and assisting in positioning said cans above the crate.

The cans advanced along rails 4 by the frictional engagement with them of endless chain 5 first collect on the bridge or gate 12 which forms a scuff plate between the end of chain 5 and elevated bottom 29. These cans on the scuff plate are then pushed along onto elevated bottom 29 by the pressure of the cans behind them which are propelled forward continuously by chain 5. The cans are pushed over the surface of elevated bottom 29, some of them being squeezed outwardly or laterally on both sides of the center line of conveyer 1 by the camming action of cans ahead combined with the forward push of cans behind. That is to say, the cans flow out of the end of conveyor 1, in an expanding or widening stream until the entire, and relatively expansive, area of elevated bottom 29 is filled with cans in random arrangement.

When the bottom 29 of the crate 21 has thus been loaded with the first layer of cans, said bottom is lowered through the medium of the lift 30 a distance substantially equal to the height of said cans. A horizontal partition or plate 44 is then placed on the layer of loaded cans for receiving the next layer. This operation is repeated until the crate 21 is fully loaded. The piston 32 of lift 30 is then lowered to its lowermost position out of engagement with the bottom 29 and the crate 21 is then moved along the overhead rail 22 to the cooking retort.

While the piston 32 is being lowered preparatory to receiving the succeeding layer of cans, also while the crate 21 is away from the conveyer 1, the gate 12 is swung upwardly to closed position for positively arresting the discharge of the cans from said conveyer. This is accomplished by forcing the rod 15 downwardly against the tension of the spring 17 and engaging the pedal 16 beneath the keeper 18. When this occurs the cam 9 is rotated in a direction to lower the shoe 7. Thus, this portion of the chain 5 is dropped below the bottom rails 4 and the cans come to rest on said rails. However, the cans may continue to accumulate on this section of the conveyer, but they are positively prevented from being discharged therefrom by the upstanding gate 12. When the crate 21 is again ready to receive the cans, the gate 12 is returned to its horizontal position to function as a bridge and the lifting of shoe 7 raises the adjacent portion of the endless chain 5 to engage and move the cans.

It will be noted that the head plate 34 of the elevating mechanism 30 inclines away from the conveyer 1 so that, although both the top of the crate and the surface of the elevated bottom disk 29 are supported in substantially horizontal position and substantially at the level of the conveyer, the surface of disk 29 and the upper rim of the crate are tilted slightly with respect to one another. Hence the circular rim of the crate side walls extends somewhat above the surface of disk 29 and functions as a guide and retainer for the cans, permitting the ring or bar 43 to be dispensed with, if desired.

In the embodiment illustrated in Figure 7 of the drawing, the crate or basket 21 is dispensed with and the conveyer 1 is installed to load the cans directly into a cooking retort 45. To this end, the hydraulic lift 30 is mounted beneath the retort 45 and the rod 33 is operable in said retort through the bottom thereof. The first layer of cans is loaded directly on the disk or head 46 on the upper end of the lift rod 33. Any suitable means may be provided for conveying the cans away from the retort 45 after the cooking operation. The operation of this embodiment of the invention is substantially similar to that of the apparatus shown in Figures 1 to 6, inclusive, of the drawing with the above-noted exception that the cans are loaded directly into the retort. In both embodiments of the invention, the hoist may be used to elevate the false bottom of the crate or retort and the processed cans thereon in successive steps for the unloading of the successive layers of cans over the rim of the receptacle.

It is believed that the many advantages of a crate loader constructed in accordance with the present invention will be readily understood, and although preferred embodiments of the apparatus are as illustrated and described, it is to be understood that further modifications and changes in the details of construction may be resorted to which will fall within the scope of the invention which is set forth in the following claims.

What is claimed is:

1. Can loading apparatus comprising the combination with a guideway having a delivery end, of a can advancing conveyor operating along the guideway and including a delivery portion movable to and from can propelling position, mechanism for moving said conveyor portion to and from such position, a gate pivoted with respect to said guideway and movable between a first position in which it serves as a discharge platform therefrom, and a second position in which it is elevated to positively obstruct can movement from said guideway, and a common operating means for said gate and said mechanism comprising connections for elevating said gate to can obstructing position and retracting said conveyor portion from can propelling position.

2. Can handling apparatus including a conveyor for cans, a crate conveyor comprising a hook for the support of a crate and means upon which the hook is movable, a crate having a bail suspended from said hook and a false bottom movable vertically within the crate, a hoist including ram means engageable with said false bottom while said crate is suspended, power means for elevating said ram means, said power means including control means for regulating the elevating and lowering of said ram means, whereby said false bottom is movable upwardly by power and downwardly under regulation by said control means within the crate.

3. The combination with a first conveyor having a work transporting surface and a table constituting an extension of such surface, of a second conveyor means leading to and from said table, a receptacle supported on said second conveyor means for movement to and from said table, said receptable having a rim, a plurality of loose false bottoms adapted to support work and to be spaced by interposed work and successively movable with supported work vertically within the receptacle to a position as high as the rim for the discharge of work thereover, and a ram disposed in a position fixed respecting said table and beneath the position of said receptacle when the receptacle is moved on said second conveyor means into proximity to said table, said ram being engageable with the lowermost false bottom and provided with power operated means for the elevation thereof independently of the receptacle, said power operated means having a control whereby the operation thereof may be controlled to regulate the elevation of the ram and false bottoms in successive steps to bring each in turn to the level of said rim.

4. The combination of a cooking retort having heating means and a cover and rim, a plurality of loose false bottoms adapted to support work and to be spaced by interposed work and successively movable with supported work vertically within the receptacle to a position as high as the rim for the discharge of work thereover, and a ram beneath the receptacle engageable with the lowermost false bottom and provided with power operated means for the elevation thereof independently of the receptacle, said power operated means having a control whereby the operation thereof may be controlled to regulate the elevation of the ram and false bottoms in successive steps to bring each in turn to the level of said rim.

5. In combination, a can receiving crate having a rim, a false bottom vertically movable within the crate, a carriage upon which the crate is mounted for bodily movement, an elevator ram positioned to engage said false bottom in one position of the carriage and crate, a can support adjacent the rim of the crate when the crate is in said position, power means for elevating said ram to raise said bottom to the level of said rim and support, and raising and lowering controls for said power means and ram, said ram having a heal upon which said false bottom is tilted respecting said crate, the rim of said crate in said position being higher than the false bottom at the side thereof remote from said support when said bottom is in registry with the support for can delivery between the table and said bottom.

CURTIS T. BUSSE.

REFERENCES CITED

The following references are of record in the file of this patent:

UNITED STATES PATENTS

| Number | Name | Date |
| --- | --- | --- |
| 496,221 | Gibon | Apr. 25, 1893 |
| 561,921 | Sutthoff | June 9, 1896 |
| 714,875 | Doble | Dec. 2, 1902 |
| 768,104 | Wieda | Aug. 23, 1904 |
| 966,872 | Tiesse | Aug. 9, 1910 |
| 1,023,343 | Tremaine | Apr. 16, 1912 |
| 1,208,802 | Lienau et al. | Dec. 19, 1916 |
| 1,208,803 | Lienau et al. | Dec. 19, 1916 |
| 1,247,722 | Rogers et al. | Nov. 27, 1917 |
| 1,289,208 | Lents | Dec. 31, 1918 |
| 1,789,773 | Rasch | Jan. 20, 1931 |
| 1,861,963 | Jennings | June 7, 1932 |
| 1,904,720 | Douglass | Apr. 18, 1933 |
| 1,941,899 | Jennings | Jan. 2, 1934 |
| 2,313,478 | Neja | Mar. 9, 1943 |
| 2,387,452 | Lundal et al. | Oct. 23, 1945 |
| 2,045,292 | Carey | June 23, 1936 |

Certificate of Correction

May 9, 1950

Patent No. 2,506,661

CURTIS T. BUSSE

It is hereby certified that errors appear in the printed specification of the above numbered patent requiring correction as follows:

Column 3, lines 20 and 21, for the word "separating" read *operating*; column 6, line 24, for "heal" read *head*; line 29, for "table" read *support*; and that the said Letters Patent should be read with these corrections therein that the same may conform to the record of the case in the Patent Office.

Signed and sealed this 12th day of September, A. D. 1950.

[SEAL]

THOMAS F. MURPHY,
*Assistant Commissioner of Patents.*